(12) United States Patent
Jenkner et al.

(10) Patent No.: US 8,310,793 B2
(45) Date of Patent: Nov. 13, 2012

(54) OVER-CURRENT PROTECTION FOR DC-TO-DC CONVERTERS

(75) Inventors: Christian Jenkner, Klagenfurt (AT); Sergio Walter, Villach (AT)

(73) Assignee: Infineon Technologies AG, Neubiberg (DE)

( * ) Notice: Subject to any disclaimer, the term of this patent is extended or adjusted under 35 U.S.C. 154(b) by 233 days.

(21) Appl. No.: 12/506,590

(22) Filed: Jul. 21, 2009

(65) Prior Publication Data

US 2011/0019315 A1   Jan. 27, 2011

(51) Int. Cl.
*H02H 9/08* (2006.01)
(52) U.S. Cl. .......................................... 361/18; 361/93.9
(58) Field of Classification Search .................... 361/18, 361/93.7–93.9
See application file for complete search history.

(56) References Cited

U.S. PATENT DOCUMENTS

| | | | | |
|---|---|---|---|---|
| 5,920,475 | A * | 7/1999 | Boylan et al. ................. | 363/127 |
| 6,588,528 | B2 * | 7/2003 | Ligman ..................... | 180/206.2 |
| 2004/0181698 | A1 * | 9/2004 | Williams ....................... | 713/300 |
| 2005/0035748 | A1 * | 2/2005 | Inn ................................. | 323/285 |
| 2005/0206358 | A1 * | 9/2005 | Van Der Horn et al. ...... | 323/282 |
| 2006/0221528 | A1 * | 10/2006 | Li et al. ......................... | 361/100 |
| 2007/0257643 | A1 * | 11/2007 | Chen et al. .................... | 323/222 |
| 2009/0128112 | A1 * | 5/2009 | Xu et al. ........................ | 323/282 |
| 2010/0124080 | A1 * | 5/2010 | Yeh et al. ................... | 363/21.12 |

OTHER PUBLICATIONS

"DC-DC Converter Tutorial", Application Note 2031, Maxim, Oct. 19, 2000, printed from the Internet at: http://www.maxim-ic.com/appnotes.cfm/an_pk/2031, 13 pgs.

* cited by examiner

*Primary Examiner* — Danny Nguyen
(74) *Attorney, Agent, or Firm* — SpryIP, LLC

(57) ABSTRACT

A DC-to-DC converter includes a switching control circuit adapted to provide a control signal having a duty cycle. A switching regulator is adapted to receive both a supply voltage having the first voltage level and the control signal. The switching regulator is further adapted to provide an output signal at the second voltage level as a function of both the supply voltage and the control signal. In addition, a current sensing circuit is adapted to provide at least one alarm signal based the duty cycle of the time-varying signal. Other systems and methods are also disclosed.

21 Claims, 5 Drawing Sheets

OVER-CURRENT PROTECTION FOR DC-TO-DC CONVERTERS

BACKGROUND

DC-to-DC converters typically convert power from one DC voltage to another DC voltage. They are usually regulated devices, taking a possibly varying input voltage, and providing a stable, regulated output voltage, often up to some current (amperage) limit.

This basic DC-to-DC conversion functionality makes DC-to-DC converters widely used for power conversion in many electronic systems, such as communications systems, among others. In this way, DC-to-DC converters can in some instances be thought of as a "black box" that receives one voltage from our nation's power grid or a battery, for example, and converts it to another voltage that is used to power an integrated circuit.

DETAILED DESCRIPTION

Figure 1:
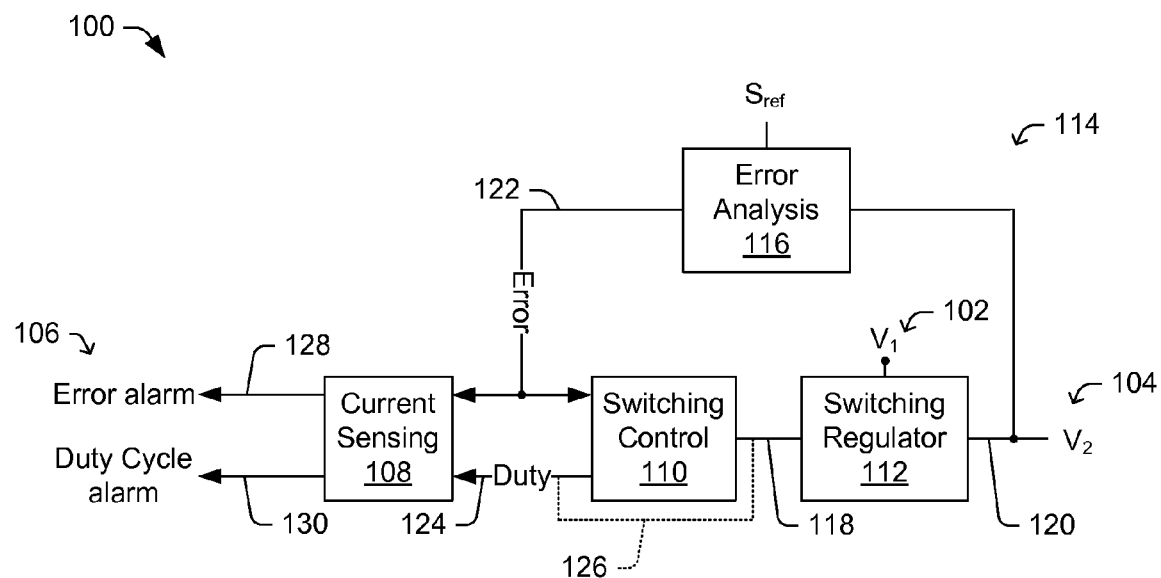
FIG. 1 is a block diagram illustrating a DC-to-DC converter in accordance with some embodiments.

One or more implementations of the present disclosure will now be described with reference to the attached drawings, where like reference numerals are used to refer to like elements throughout. Nothing in this detailed description is admitted as prior art.

Some embodiments disclosed herein relate to a techniques for DC-to-DC conversion. As the inventors have appreciated, previous DC-to-DC conversion techniques are unable to adequately detect when an over-current condition is present at a load. The DC-to-DC conversion techniques disclosed herein regulate a DC supply voltage by using a control signal having a duty cycle. To limit over-current conditions, at least one alarm signal is provided, where the alarm signal is based on the duty cycle of the control signal.

FIG. 1 shows one embodiment of a DC-to-DC converter 100. Like many DC-to-DC converters, the DC-to-DC converter 100 includes a supply or input terminal 102 and an output terminal 104. During operation, a DC supply signal having a first voltage level ($V_1$) is provided on the input terminal 102. The DC-to-DC converter then converts the DC supply signal to a DC output signal having a second voltage level $V_2$. Although the first and second voltage levels $V_1$, $V_2$ could be the same in some instances, typically the first and second voltage levels are different. For example, in one embodiment, the first voltage level $V_1$ is about 3.3 volts and the second voltage level $V_2$ is about 1.0 volts, which is an example of a step-down or "buck" converter.

In addition to this DC voltage conversion functionality, the DC-to-DC converter 100 is configured to monitor current in the DC-to-DC converter 100 and provide at least one alarm signal 106 indicative of an over-current situation. Such over-current conditions may happen, for example, when there is a short or a low ohmic load at the output terminal 104, or when other failures, such as a damaged switching device for example, have occurred. Absent such an alarm signal 106, over-current situations could damage or destroy the DC-to-DC converter 100. Consequently, if an over-current situation is detected, the DC-to-DC converter 100 is adapted to take action in response to the alarm signal 106 to limit the current and prevent damage.

To facilitate the desired functionality, the illustrated DC-to-DC converter 100 includes a current sensing circuit 108, a switching control circuit 110, a switching regulator 112, and a feedback path 114 that includes an error analysis circuit 116. These components are collectively arranged so that the DC-to-DC converter 100 operates in a continuous current mode.

During operation, the switching control circuit 110 provides a control signal 118 having a duty cycle. As used, herein the term "duty cycle" is used to describe a fraction of time that the control signal 118 is in an active state relative to an inactive state (or vice versa). For example, a 30% duty cycle can indicate that the control signal 118 is in a continuous active state for 30% of a control signal period and is in a continuous inactive state for the remaining 70% of the control signal period.

The switching regulator 112 receives the control signal 118 as well as the DC supply signal from the input terminal 102. Based on the control signal 118 and the DC supply signal, the switching regulator 112 provides a DC output signal 120 at the output terminal 104.

The error analysis circuit 116 compares the DC output signal 120 to a reference signal ($S_{ref}$) to provide an error signal 122. The error signal 122 is fed back to the switching control circuit 110, which then adjusts the control signal 118 in response to the error signal 122. For example, if the error analysis circuit 116 determines the second voltage level $V_2$ is lower than the reference signal ($S_{Ref}$), the error signal 122 can enable the switching control circuit 110 to change the control signal 118 to increase the second voltage level $V_2$. Conversely, if the error analysis circuit 116 determines the second voltage level $V_2$ is higher than the reference signal ($S_{REF}$), the error signal 122 can enable the switching control circuit 110 to change the control signal 118 and decrease the second voltage level $V_2$. In this manner, the feedback path 114 can keep the second voltage level $V_2$ "tuned" in accordance with the reference signal $S_{ref}$, thereby maintaining a desired relationship between the first and second voltages $V_1$, $V_2$.

To monitor and limit over-current conditions, the current sensing circuit 108 receives the error signal 122 as well as a duty cycle signal 124. The duty cycle signal 124 can be provided directly from the switching control circuit 110, or can be derived from control signal 118 by monitoring circuitry (not shown) as shown by line 126. In any event, the current sensing circuit 108 is adapted to provide at least one alarm signal 106 that can be used to limit current through the switching regulator, for example. The illustrated embodiment shows two separate alarm signals, namely, an error alarm signal 128 and a duty cycle alarm signal 130, some embodiments of which will be described in more detail further herein. See, for example, FIGS. 3-4 and accompanying text.

Figure 2:
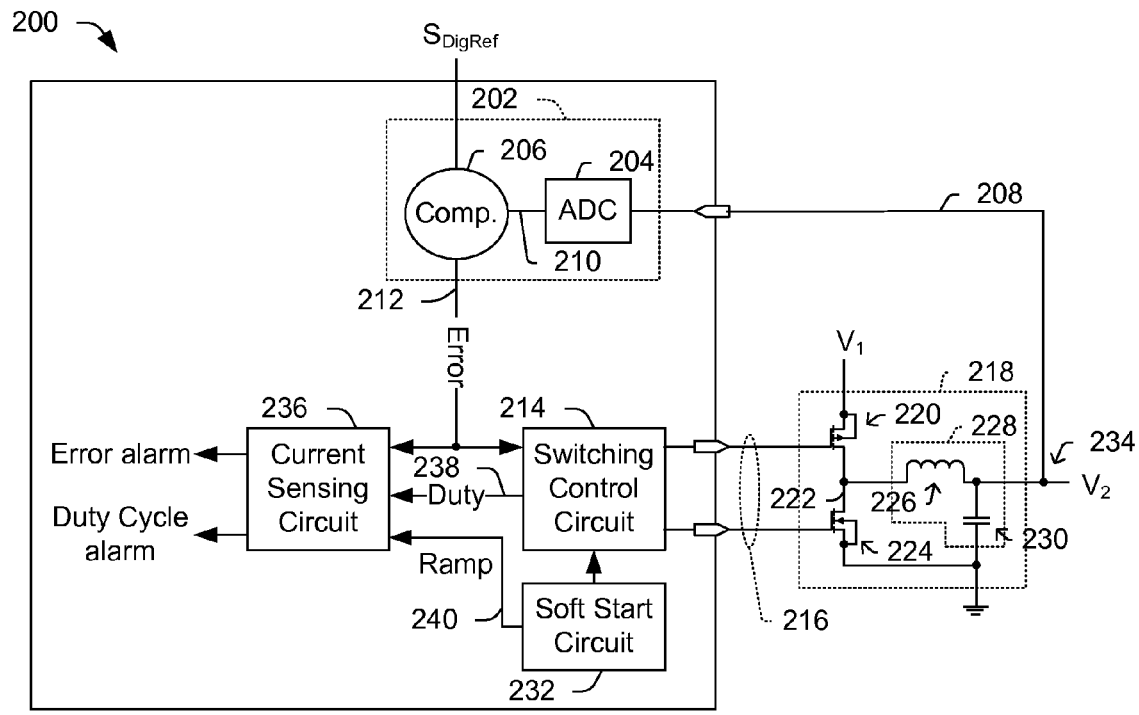
FIG. 2 is a block diagram illustrating another DC-to-DC converter in accordance with some embodiments.

FIG. 2 shows a more detailed implementation a DC-to-DC converter 200. In FIG. 2's example, an error analysis circuit 202 comprises an analog-to-digital converter (ADC) 204 and a comparator 206. The ADC 204 converts a DC output signal 208 to a digitized signal 210. The comparator 206 then compares the digitized signal 210 to a digital reference signal $S_{DigRef}$, thereby providing a digital error signal 212. The digital reference signal $S_{DigRef}$ can be a multi-bit digital value, such as a 16-bit value for example.

Upon receiving the digital error signal 212, the switching control circuit 214 then uses the digital error signal 212 to provide a control signal 216 to the switching regulator 218.

The switching regulator 218 in FIG. 2's example includes a first switching element 220 coupled between an intermediary output node 222 and a DC supply voltage $V_1$. The DC-to-DC converter 200 also includes a second switching element 224 coupled between the intermediary output node 222 and a second DC supply voltage (e.g., ground (GND)). An inductor 226 is used as the current storage element. A low pass filter 228, which comprises the inductor 226 and a capacitor 230, is coupled between the intermediary output node 222 and the error analysis circuit 202. The first and second switching elements 220, 224 are generally complementary, such that the control signal 216 turns one of the switching elements ON while the other switching element is OFF according to the duty cycle of the control signal 216.

The DC-to-DC converter 200 also includes a soft start circuit 232 that is adapted to gradually ramp the DC output signal on the output terminal 234 from an initial voltage level to the second voltage level $V_2$ during a soft start interval for the DC-to-DC converter. This "soft start" functionality is advantageous in that it allows the devices to gradually power up, potentially preventing large power spikes, particularly when power is monitored during this soft start interval. A more detailed explanation of one embodiment of this functionality will be described and illustrated further herein. See, for example, FIGS. 3-4.

Figure 3:
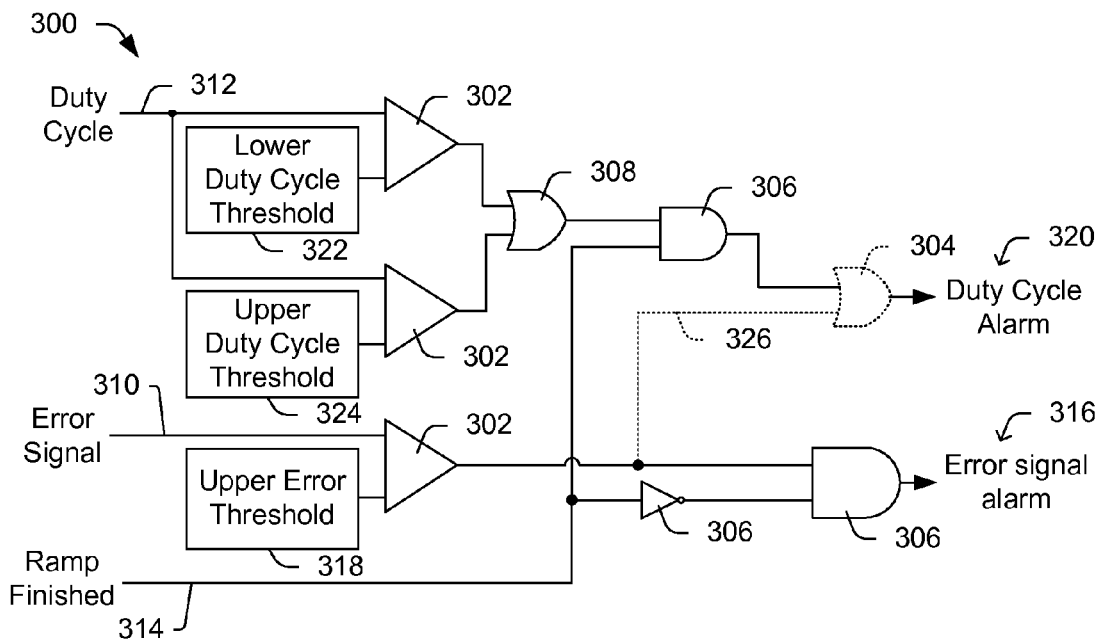
FIG. 3 is a block diagram illustrating a current sensing circuit in accordance with some embodiments.

FIG. 3 illustrates one manner in which a current sensing circuit 300 (e.g., current sensing circuit 108 or 234) can be implemented. Although the illustrated current sensing circuit 300 includes comparators 302, logical OR gates 304, logical AND gates 306, and an inverter 308, it will be appreciated that the illustrated logical components are merely illustrative and a myriad of other circuit arrangements could be used to achieve the described functionality.

During operation, the current sensing circuit 300 utilizes error signal 310 (e.g., error signal 122 or 212), control signal duty cycle 312 (e.g., control signal 118 or 216), and a ramp finished signal 314 (e.g., ramp signal 240 from FIG. 2). An error alarm signal 316 is activated only if the error signal 310 exceeds an upper error threshold value provided by an upper error threshold circuit 318, such as a register, for example. In some embodiments, this error alarm signal 316 is activated only during a "soft" startup of the DC-to-DC converter when the ramp finished signal 314 is low. In addition, in some embodiments, during "soft" start-up software has not yet been loaded, so a hardware mechanism can shut down the DC-to-DC converter if the error alarm signal 316 is activated.

A duty cycle alarm 312 can also be activated. The duty cycle alarm 320 can be activated if either (1) the control signal duty cycle 312 is less than a lower duty cycle threshold value provided by a lower duty cycle threshold circuit 322, or (2) the control signal duty cycle 312 exceeds an upper duty cycle threshold value provided by an upper duty cycle threshold circuit 324. In some embodiments, the duty cycle alarm 320 and error alarm signal 316 can be related to one another (as indicated by line 326), but in other embodiments these alarm signals can be independent of one another.

In one embodiment, the duty cycle control signal can remain between the upper and lower duty cycle thresholds according to the following relations:

$$V = L \cdot \frac{di}{dt}$$

$$\begin{cases} V_{dd} - R \cdot I - V_{out} = L \cdot \frac{\Delta I^+}{D \cdot T} \\ V_{out} + R \cdot I = L \cdot \frac{\Delta I^-}{(1-D) \cdot T} \\ \Delta I^+ - \Delta I^- = 0 \text{ stady state} \end{cases}$$

$$\updownarrow$$

$$D = \frac{V_{out} + R \cdot I}{V_{dd}} \Rightarrow \begin{cases} D_{min} = \frac{V_{out} \cdot (1 - y\%) + R_{min} \cdot I_{min}}{V_{dd} \cdot (1 + x\%)} \\ D_{max} = \frac{V_{out} \cdot (1 + y\%) + R_{max} \cdot I_{max}}{V_{dd} \cdot (1 - x\%)} \end{cases}$$

where L is the inductance of the inductor 220; di/dt is the change in current through the inductor 220 over time; $R_{min}$ and $R_{max}$ represent the max range of the parasitic resistance of the switching elements 212, 216 and the inductor 220; (x %) is the max allowed accuracy of the first voltage level ($V_{DD}$ supply); and y % is the desired accuracy of the second voltage level ($V_{out\ output}$), D is the duty cycle, T is the switching period, I max is the max allowed current in the application. Thus, if the actual control signal duty cycle falls outside of the allowed duty cycle range, an abnormal situation may be present.

Figure 4:
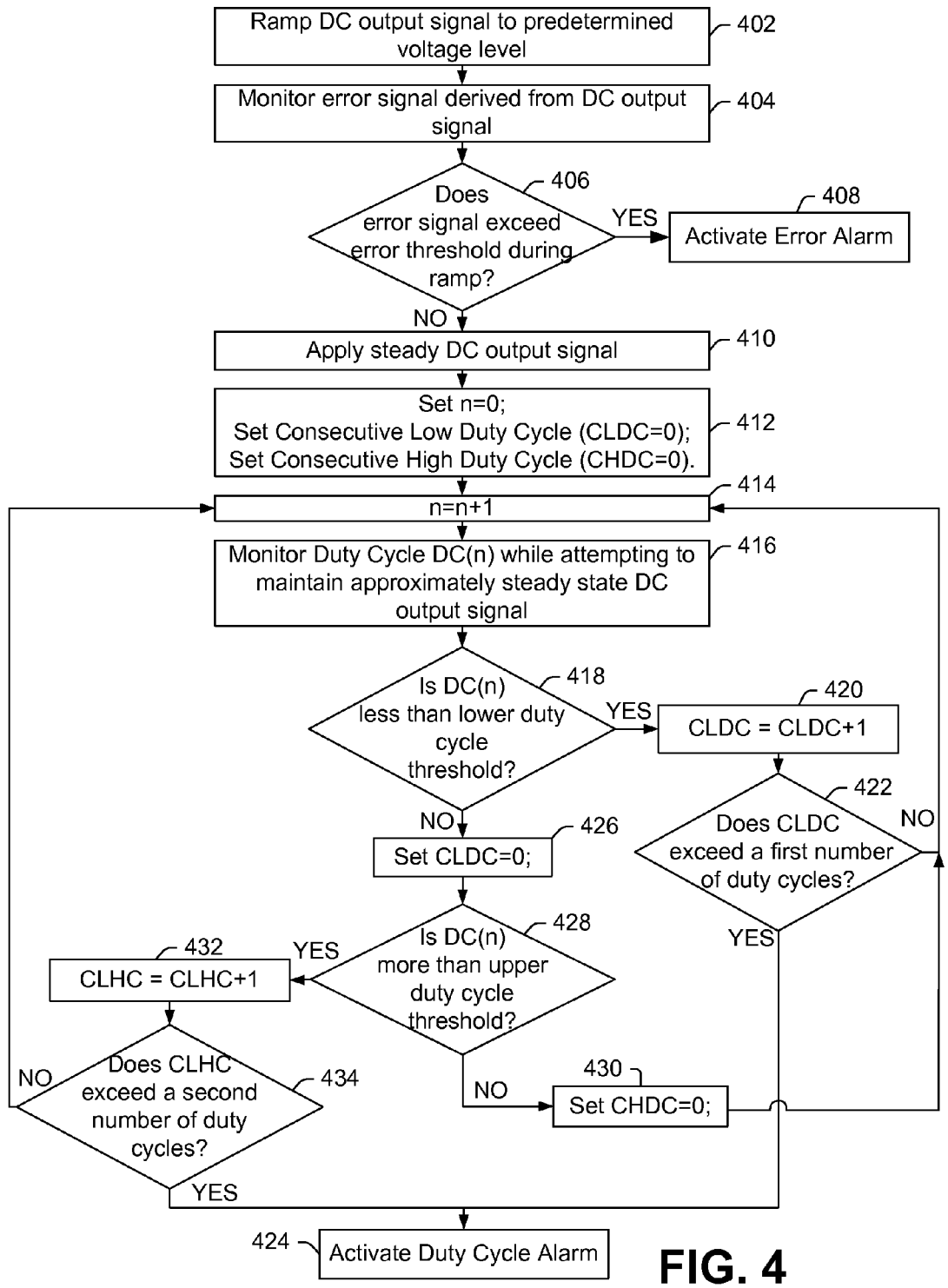
FIG. 4 is a flowchart diagram illustrating a method for DC voltage conversion in accordance with some embodiments.
Figure 5:
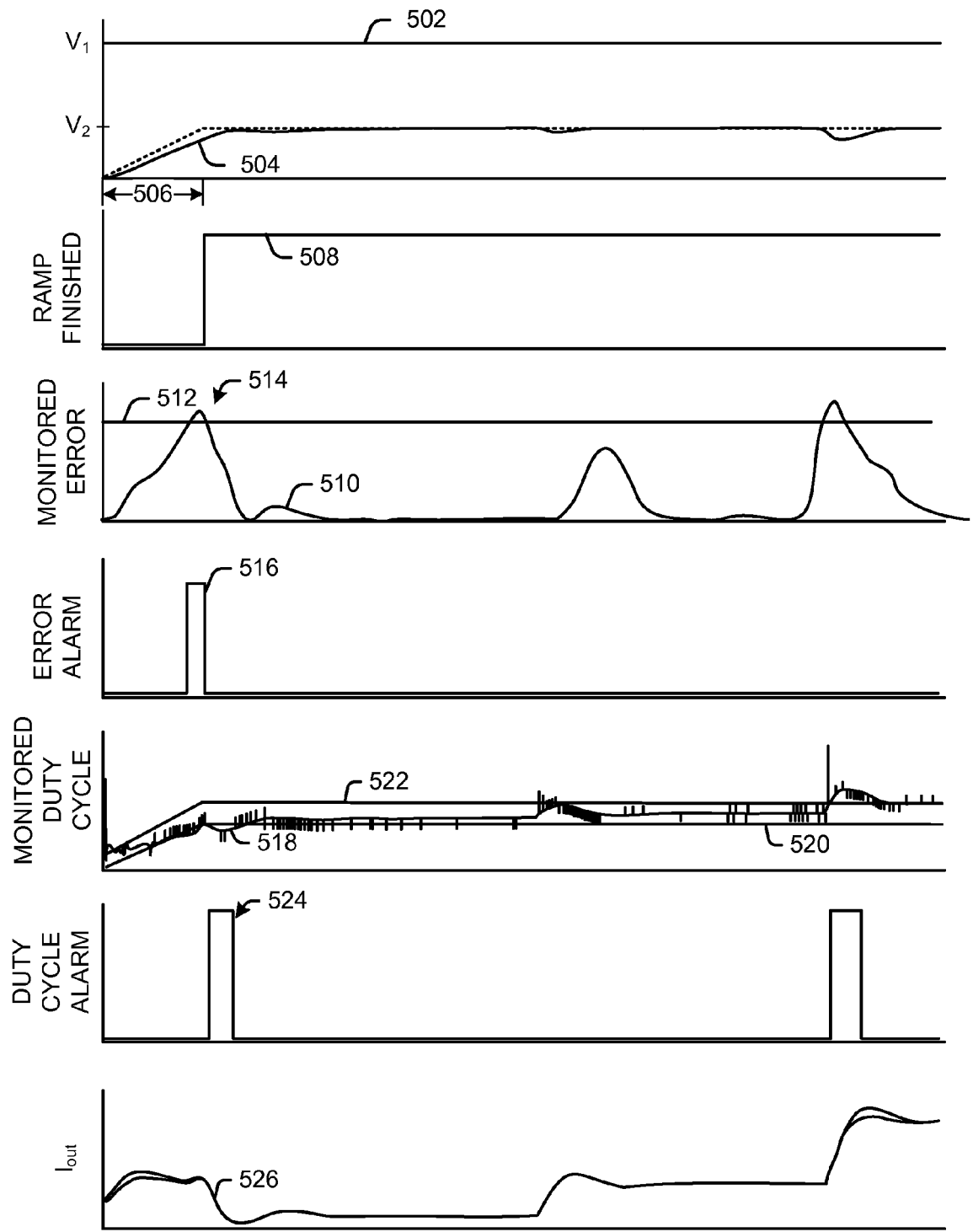
FIG. 5 is a waveform timing diagram illustrating a method for DC voltage conversion in accordance with some embodiments.

Now that some examples of circuits have been discussed, reference is made to FIGS. 4-5, which show methods 400, 500 in accordance with some aspects. FIG. 4 shows a method 400 in flowchart format while FIG. 5 shows a method 500 in the context of waveforms. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

FIG. 4's method starts at 402 when, during a soft start interval, a DC output signal is gradually ramped up to predetermined voltage level.

At 404, an error signal, which is derived from the DC output signal, is monitored during the ramp. If the error signal exceeds an error threshold during the ramp ("YES" at 406), an error alarm signal is activated at 408. If the error signal does not exceed an error threshold during the ramp ("NO" at 406), the method proceeds to 410 during which the DC output signal reaches an approximately steady state voltage.

At 412, several variables are initialized to monitor the control signal duty cycle. The first listed variable, n is an index that identifies a particular control signal duty cycle. Consecutive Low Duty Cycles (CLDC) keeps track of the number of consecutive duty cycles during which a monitored control signal duty cycle falls below a lower duty cycle threshold. Consecutive High Duty Cycles (CHDC) keeps track of the number of consecutive duty cycles during which the monitored control signal duty cycle exceeds an upper duty cycle threshold.

Thus, at 416, duty cycle DC(n) is monitored.

At 418, a determination is made whether the duty cycle DC(n) is less than a lower duty cycle threshold. If so (YES at 418), CLDC is incremented at 420 and the method determines whether CLDC exceeds a first number of duty cycles at 422. For example, the method could determine whether CLDC exceeds five, ten, or a hundred control signal duty cycles. If CLDC exceeds a first number of duty cycles (YES at 422), the duty cycle alarm signal is activated at 424. In some implementations, the duty cycle alarm signal can be stored in a register, thereby generating an interrupt. Software, such as an interrupt service routine controlling the DC-to-DC converter, can then alter the duty cycle of the control signal to limit current provided to the output terminal of the DC-to-DC converter. Otherwise (NO at 422), the method monitors the next duty cycle at 416.

If the duty cycle DC(n) meets or exceeds the lower duty cycle threshold (NO at 418), then CLDC is set to zero at 426. The method then determines whether duty cycle DC(n) exceeds an upper duty cycle threshold at 428. If not (NO at 428), the method sets CHDC to zero at 430 and then continues monitoring the next duty cycle. However, if the duty cycle DC(n) exceeds the upper duty cycle threshold (YES at 428), then CLHC is incremented at 432 and a determination as to whether CLHC exceeds a second number of duty cycles is made in 434. If CLHC exceeds the second number of duty cycles (YES at 434), the duty cycle alarm is activated at 424. Otherwise (NO at 434), the next duty cycle is monitored at 416.

FIG. 5 shows some illustrative waveforms as a function of time. The first waveform plot shows a DC supply signal 502 having a first voltage $V_1$ (e.g., about 3.3 V) and a DC output signal 504 having a second voltage $V_2$ (e.g., about 1.0 V once it reaches steady state). The DC supply signal 502 can be applied to an input terminal (e.g., input terminal 102a in FIG. 2) and the DC output signal 504 can be provided at an output terminal (e.g., output terminal 104a in FIG. 2) of a DC-to-DC converter.

During soft start interval 506, the DC output signal 504 is ramped from an initial voltage level to the second voltage level $V_2$, which corresponds to a reference signal (e.g., $S_{Ref}$ in FIG. 2). During this soft start interval 506, a ramp finished signal 508 is inactive (e.g., low).

An error signal 510 (e.g., digital error signal 208 in FIG. 2) is monitored and compared to an upper error threshold 512 during the soft start interval 506. If the error signal 510 exceeds the upper error threshold 512 as shown at time 514, an error alarm signal 516 is activated. At this point, the DC-to-DC converter could shut down in response to the error alarm signal 516, thereby limiting potentially damaging over current through the device. In this example, the DC-to-DC converter does not shut down, but rather continues to operate to show additional functionality. Thus, at the end of the soft start interval 506, the DC output signal 504 reaches the second voltage $V_2$ and the ramp finished signal 508 goes high, which in this example deactivates the error alarm signal 516.

After completion of the soft start interval 506, the DC-to-DC converter monitors a control signal duty cycle 518 and analyzes whether the duty cycle is between a lower duty cycle threshold 520 and an upper duty cycle threshold 522. Just after the end of the soft start interval 506, for example, the control signal duty cycle 518 falls below the lower duty cycle threshold 520. Because the duty cycle falls below the lower level duty cycle for more than some predetermined number of periods of the control signal, a duty cycle alarm signal 524 is activated. The DC-to-DC converter can take action based on the duty cycle alarm signal 524 to limit current to the DC-to-DC converter and prevent damage to the DC-to-DC converter. The first pulse in 524 shows a scenario where the load becomes high ohmic (e.g. after the soft start interval, when all capacitive loads are fully charged), and the voltage V2 is too high. The second pulse in 524 shows a situation where the load is low ohmic, and more current than allowed flows into the load. The waveform 526 shows the output current. (e.g., at output terminal 104a in FIG. 2).

Notably, at some times the monitored duty cycle may "spike" above or below the upper or lower duty cycle thresholds. These "spikes" do not necessary trigger the duty cycle alarm signal because the duty cycle alarm is triggered only when the control signal duty cycle falls outside of the upper or lower threshold values for some pre-determined number of control signal periods.

Figure 6:
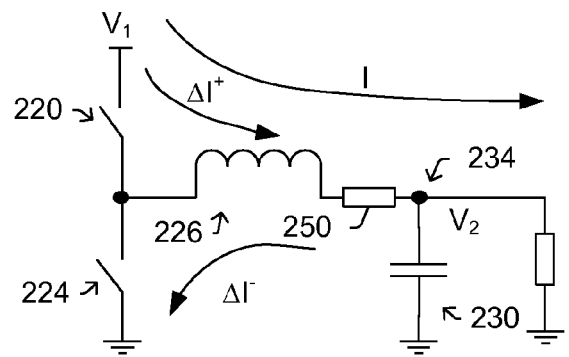
FIGS. 6-8 show current estimation techniques in accordance with some embodiments.
Figure 7:
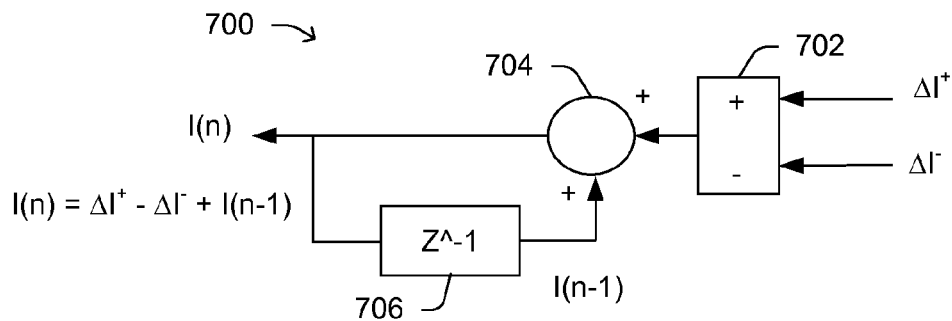
Figure 8:
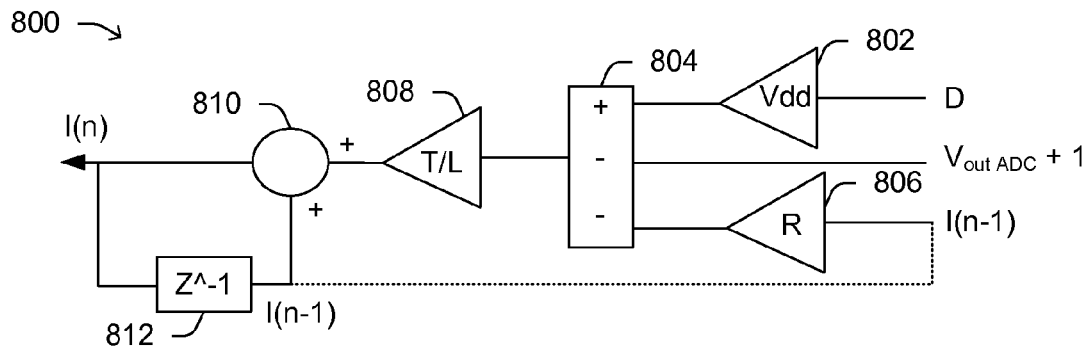

Referring now to FIGS. 6-8, some additional embodiments are discussed. These additional embodiments relate to digital current estimation techniques for estimating the physical value of the current in the inductor based on internal parameters of a DC-to-DC converter and on the output voltage at the output terminal. These methods are often performed by a controller, which can for example be located in a current sensing circuit (e.g., 108 in FIG. 1 or 234 in FIG. 2) and which can measure total current (I) by comparing current into the load (ΔI+) with current back from the load (ΔI−) along with other parameters of the DC-to-DC converter.

FIG. 6 shows a functional diagram of how total current (I) can be measured by comparing current into the load (ΔI+) with current back from the load (ΔI−). For clarity, the reference numerals in FIG. 7 are consistent with FIG. 2's DC-to-DC converter 200, however it will be appreciated that the current estimation techniques described with regards to FIGS. 6-8 can also be used with the other embodiments (e.g., FIG. 1).

By using the formulas below, the physical value of the current in the inductor 226 can be determined.

$$V = L\frac{di}{dt}$$

$$\begin{cases} V_{dd} - R \cdot I - V_{out} = L \cdot \frac{\Delta I^+}{D \cdot T} \\ V_{out} + R \cdot I = L \cdot \frac{\Delta I^-}{(1-D) \cdot T} \\ I(n) = \Delta I^+ - \Delta I^- + I(n-1) \end{cases}$$

$$I(n) = \frac{T}{L} \cdot (V_{dd} \cdot D - V_{out} - R \cdot I(n-1)) + I(n-1)$$

More specifically, the physical value of the current through the inductor (I(n)) can be found by using digital representations of D (the duty cycle), T (the switching period), L (the inductance of the inductor 226), $V_{DD}$ (the DC supply voltage), R (the resistance of resistor 250), and the output of the ADC.

FIGS. 7-8 show block diagrams current estimators 700, 800 that can be used to implement FIG. 6's functionality, and which may be implemented as hardware, software, or combinations thereof. For example, in some embodiments, the current estimators 700, 800 may be implemented as software instructions that are executable on a controller (e.g., a microcontroller or digital signal processor (DSP)), while in other embodiments the current estimators 700, 800 can be made of discrete hardware components coupled together to achieve the desired functionality.

In FIG. 7, the current estimator 700 derives the current (I(n)) through the inductor 226 by analyzing current flowing into the load (ΔI+) and current flowing out of the load (ΔI−).

The current estimator 700 uses includes an arithmetic unit 702 to determine the difference between ΔI+ and ΔI−. The difference is then fed to an integrator, which includes a summation element 704 and a delay register 706, which keeps a running tabulation of the current I(n) that accounts for the real time changes in currents ΔI+, ΔI−.

In FIG. 8, another implementation of a current estimator 800 bases the current (I(n)) on the control signal duty cycle (D) and the output voltage of the ADC. A first gain stage 802 multiplies the duty cycle by $V_{DD}$ to provide a first signal to an arithmetic unit 804. A second signal, the output voltage of the ADC, is also provided to the arithmetic unit 804. In addition, a second gain stage 806 multiplies the previous current level I(n-1) by the resistance R to provide a third signal to the arithmetic unit 804. The output of the arithmetic unit is then fed to a third gain stage 808, which multiplies the output times the switching period T over the inductance L. An integrator, which includes a summation element 810 and a delay register 812, provides the current I(n).

With these current estimators it is possible to create a "tube" having an upper current threshold and a lower current threshold, which represent the current extremes in normal operation. If the estimated current is greater than the upper current threshold or lower than the lower current threshold, a current alarm is activated.

Although examples of techniques that are consistent with some implementations have been illustrated and described with respect to one or more implementations above, alterations and/or modifications may be made to the illustrated examples without departing from the spirit and scope of the appended claims. For example, although some examples have been discussed above in the context of a step-down converter (e.g., FIG. 1 DC-to-DC converter 100) where a second voltage level $V_2$ is less than a first voltage level $V_1$, it will be appreciated that the concepts disclosed herein are also applicable to other types of converters. For example, in some embodiments (e.g., a "boost" converter), the second voltage level $V_2$ can be greater than the first voltage level $V_1$. Other configurations of DC-to-DC converters are also contemplated as falling within the scope of the present disclosure, including but not limited to: "fly back" converters and "inverter" converters, among others.

In addition, although switching elements have been illustrated and described above with respect to metal oxide semiconductor field effect transistors (MOSFETs), it will be appreciated that other switching elements can also be used. For example, bipolar junction field effect transistors (BJTs), vacuum tubes, and other types of switching devices can also be used.

Certain terms are used throughout the specification to refer to particular system components. As one skilled in the art will appreciate, different companies can refer to a component by different names. This document does not intend to distinguish between components that differ in name but not function herein. In this document the terms "including" and "comprising" are used in an open ended fashion, and thus should be interpreted to mean "including, but not limited to . . . ." Also, the term "couple" (and variations thereof) is intended to mean either an indirect or direct electrical connection. Thus, if a first element couples to a second element, that connection may be a direct electrical connection, or may be an indirect electrical connection via other elements and connections.

Although various numeric values are provided herein, these numeric values are merely examples should not be used to limit the scope of the disclosure. Also, all numeric values are approximate.

In addition, while a particular feature may have been disclosed with respect to only one of several implementations, such feature may be combined with one or more other features of the other implementations as may be desired and advantageous for any given or particular application.

What is claimed is:

1. An apparatus, comprising:
a switching control circuit to provide a control signal having a duty cycle;
a switching regulator to receive a DC supply signal and the control signal, the switching regulator to regulate the DC supply signal by using the control signal to generate an output signal; and
a current sensing circuit to provide at least one alarm signal based on the duty cycle of the control signal.

2. The apparatus of claim 1, where the DC supply signal has a first DC voltage level and wherein the output signal has a second DC voltage level that differs from the first DC voltage level.

3. The apparatus of claim 1, further comprising:
an error analysis circuit on a feedback path between an output of the switching regulator and an input of the switching control circuit, the error analysis circuit adapted to compare the output signal to a reference signal and provide an error signal on which the control signal is based.

4. The apparatus of claim 3, where the current sensing circuit is adapted to selectively provide the at least one alarm signal based on whether the error signal is greater than an upper error threshold value.

5. The apparatus of claim 3, where the switching regulator comprises:
a first switching element coupled between an intermediary output node and a first supply voltage; and
a second switching element coupled between the intermediary output node and a second supply voltage; and
a filter including an inductor coupled between the intermediary output node and the feedback path.

6. The apparatus of claim 3, where the error analysis circuit comprises:
an analog-to-digital converter adapted to convert the output signal to a digitized signal; and
a comparator adapted to compare the digitized signal to a multi-bit reference value thereby providing a digital error signal on which the control signal is based.

7. The apparatus of claim 1, where the current sensing circuit comprises:
a lower duty cycle threshold circuit adapted to provide a lower duty cycle threshold value; and
at least one comparator adapted to compare the duty cycle to the lower duty cycle threshold value and facilitate output of the at least one alarm signal.

8. The apparatus of claim 1, where the current sensing circuit comprises:
an upper error threshold circuit adapted to provide an upper error threshold value; and
at least one comparator adapted to compare the duty cycle to the upper error threshold value and facilitate output of the at least one alarm signal.

9. The apparatus of claim 1, where the current sensing circuit is adapted to facilitate output of the at least one alarm signal based on whether the duty cycle is greater than an upper duty cycle threshold for more than a first number of consecutive duty cycle periods and less than a lower duty cycle threshold for more than a second number of consecutive duty cycle periods.

10. The apparatus of claim 1, further comprising:
a soft start circuit adapted to gradually ramp the output signal from an initial voltage level to the second voltage level during a soft start interval for the DC-to-DC converter.

11. An apparatus, comprising:
a switching control circuit to provide a control signal having a duty cycle; a switching regulator to regulate a DC supply signal and provide a DC output signal based on the DC supply signal and the control signal;
an error analysis circuit on a feedback path coupled between the switching control circuit and the switching regulator, the error analysis circuit to provide an error signal as a function of the DC output signal and a reference signal; and
a current sensing circuit coupled to the switching control circuit to provide at least one alarm signal based on the duty cycle of the control signal to limit an over-current condition in the switching regulator.

12. The apparatus of claim 11, the switching regulator comprising:
a first switching element coupled between an intermediary output node and a first supply voltage; and
a second switching element coupled between the intermediary output node and a second supply voltage; and
a filter including an inductor coupled between the intermediary output node and the feedback path.

13. The apparatus of claim 11, the error analysis circuit comprising:
an analog-to-digital converter having an input and an output, the input of the analog-to-digital converter coupled to the output of the switching regulator; and
a comparator coupled between the output of the analog-to-digital converter and the input of the switching control circuit.

14. The apparatus of claim 11, the current sensing circuit comprising:
an upper duty cycle threshold circuit; and a first comparator coupled to the upper duty cycle threshold circuit and adapted to facilitate provision of the at least one alarm signal.

15. The apparatus of claim 14, the current sensing circuit further comprising:

a lower duty cycle threshold circuit; and
a second comparator coupled to the lower duty cycle threshold circuit and adapted to facilitate provision of the at least one alarm signal.

16. A method of transforming a first voltage level to a second voltage level using a DC-to-DC converter, comprising:
providing a DC supply signal having the first voltage level at an input terminal of the DC-to-DC converter;
regulating the DC supply signal via a control signal having a duty cycle, the regulating generating a DC output signal having the second voltage level at an output terminal of the DC-to-DC converter; and
providing a duty cycle alarm if the duty cycle has a predetermined relationship with a duty cycle threshold at least defined by lower and upper thresholds.

17. The method of claim 16, further comprising:
wherein the predetermined relationship is met if the duty cycle is less than the lower duty cycle threshold for more than a first number of consecutive duty cycles, and if the duty cycle is greater than the upper duty cycle threshold for more than a second number of consecutive duty cycles.

18. The method of claim 16, further comprising:
comparing the DC output signal to a reference signal and generating an error signal in response thereto; and
providing an error signal alarm if the error signal is greater than an error threshold.

19. The method of claim 18, where the error signal alarm is provided only during a soft start interval during which the DC output signal is ramped from an initial voltage level to the second voltage level.

20. The method of claim 16, further comprising:
counting a number of consecutive duty cycles for which the duty cycle is less than the lower duty cycle threshold; and
resetting the number of consecutive duty cycles if the duty cycle increases to be greater than the lower duty cycle threshold.

21. The method of claim 16, further comprising:
counting a number of consecutive duty cycles for which the duty cycle is greater than the upper duty cycle threshold; and
resetting the number of consecutive duty cycles if the duty cycle decreases to be less than the upper duty cycle threshold.

\* \* \* \* \*